(12) United States Patent
Michotte De Welle

(10) Patent No.: US 9,806,669 B2
(45) Date of Patent: Oct. 31, 2017

(54) SINGLE-AXIS FOLLOWER SUPPORT SYSTEM FOR A SOLAR COLLECTOR

(71) Applicant: OPTIMUM TRACKER, Meyreuil (FR)

(72) Inventor: Madyan Michotte De Welle, Marseilles (FR)

(73) Assignee: OPTIMUM TRACKER, Meyreuil (FR)

( * ) Notice: Subject to any disclaimer, the term of this patent is extended or adjusted under 35 U.S.C. 154(b) by 0 days.

(21) Appl. No.: 15/124,659

(22) PCT Filed: Oct. 29, 2015

(86) PCT No.: PCT/FR2015/052921
§ 371 (c)(1),
(2) Date: Sep. 8, 2016

(87) PCT Pub. No.: WO2016/071608
PCT Pub. Date: May 12, 2016

(65) Prior Publication Data
US 2017/0237391 A1  Aug. 17, 2017

(30) Foreign Application Priority Data
Nov. 5, 2014 (FR) .................................. 14 60672

(51) Int. Cl.
*E04G 3/20* (2006.01)
*H02S 20/32* (2014.01)
(Continued)

(52) U.S. Cl.
CPC ............. *H02S 20/32* (2014.12); *F16M 11/10* (2013.01); *F16M 11/18* (2013.01); *F24J 2/5232* (2013.01);
(Continued)

(58) Field of Classification Search
CPC .......... F24J 2/5232; F24J 2/526; H02S 20/00; H02S 20/10
(Continued)

(56) References Cited

U.S. PATENT DOCUMENTS 7,600,349 B2 * 10/2009 Liebendorfer ......... F24J 2/5207
136/244
7,780,472 B2 * 8/2010 Lenox ................... F24J 2/5211
136/251
(Continued)

FOREIGN PATENT DOCUMENTS

FR    3001793 A1    8/2014
KR    20120053178 A  5/2012

OTHER PUBLICATIONS

Written Opinion Report dated Jan. 20, 2016 re: Application No. PCT/FR2015/052921; pp. 1-7; citing: US 2013/039610 A1, KR 2012 0053178 A.
(Continued)

*Primary Examiner* — Steven Marsh
(74) *Attorney, Agent, or Firm* — Cantor Colburn LLP

(57) ABSTRACT

The invention relates to a single-axis follower support system (1) for a solar collector (9) comprising a stationary structure (2) for anchoring to the ground; and a platform (30) suitable for supporting a solar collector, attached to at least one central horizontal beam (32) rotatably mounted on the stationary structure along a horizontal rotational axis inside at least one bearing (4) attached to the stationary structure; wherein the at least one bearing (4) comprises: a rotatable part (5) having a cavity (50) for receiving the central beam and a guide rail (51) in the shape of a circular arc centered on said horizontal rotational axis, wherein said guide rail extends below said cavity; and a base (7) retained on the stationary structure and onto which rolling members are attached which are rollingly mounted in the guide rail of the rotatable part.

13 Claims, 4 Drawing Sheets

(51) Int. Cl.
*F16M 11/10* (2006.01)
*F16M 11/18* (2006.01)
*F24J 2/52* (2006.01)
*F24J 2/54* (2006.01)

(52) U.S. Cl.
CPC ........ *F24J 2/541* (2013.01); *F24J 2002/5475* (2013.01); *F24J 2002/5482* (2013.01)

(58) Field of Classification Search
USPC ................... 248/237; 52/655.1, 698, 173.3
See application file for complete search history.

(56) References Cited

U.S. PATENT DOCUMENTS

| | | | |
|---|---|---|---|
| 7,857,269 B2 * | 12/2010 | Plaisted | F16L 3/127 |
| | | | 248/125.8 |
| 8,776,454 B2 * | 7/2014 | Zuritis | F24J 2/5207 |
| | | | 126/621 |
| 9,160,273 B2 * | 10/2015 | Schuit | F16B 2/065 |
| 9,553,543 B2 * | 1/2017 | Kitano | F24J 2/5207 |
| 2011/0030285 A1 * | 2/2011 | Kaufman | E04H 6/025 |
| | | | 52/82 |
| 2011/0072740 A1 * | 3/2011 | Dieter | E04C 3/34 |
| | | | 52/173.3 |
| 2011/0253195 A1 | 10/2011 | Kim | |
| 2012/0085041 A1 * | 4/2012 | Place | F24J 2/523 |
| | | | 52/173.3 |
| 2013/0039610 A1 | 2/2013 | Schneider et al. | |
| 2014/0318045 A1 * | 10/2014 | Gezelman | H02S 20/23 |
| | | | 52/173.3 |

OTHER PUBLICATIONS

International Search Report dated Jan. 20, 2016 re: Application No. PCT/FR2015/052921; pp. 1-2; citing: US 2013/039610 A1, KR 2012 0053178 A, FR 3 001 793 A1 and US 2011/253195 A1.

* cited by examiner

SINGLE-AXIS FOLLOWER SUPPORT SYSTEM FOR A SOLAR COLLECTOR

TECHNICAL FIELD

The present invention relates to a tracker support system for at least one solar collector, in particular of the type photovoltaic panel.

The disclosure lies in the field of single-axis tracker support systems, also called solar followers or solar trackers, that is to say of the type pivoting around one single horizontal axis of rotation for a rotation allowing to track the sun during its rise and its descent.

The invention finds an application in single-axis tracker support systems supporting one or several solar collector(s), in particular of the type:

photovoltaic solar panel integrating photovoltaic cells transforming the solar radiation into electrical energy;

concentrated photovoltaic solar panel integrating optical systems for concentrating the solar radiation, such as Fresnel lenses, loupes or mirrors, allowing to make the solar radiation converge towards photovoltaic cells, such as for example high-concentration photovoltaic solar panels, also called «HCPV» standing for «High Concentration PhotoVoltaic», or low-concentration photovoltaic solar panels, also called «LCPV» standing for «Low Concentration Photo-Voltaic»;

solar panel transforming the solar radiation into thermal energy;

mirror panel reflecting the solar radiation towards a solar receiver.

More particularly, the invention relates to a single-axis tracker support system comprising a fixed structure for anchorage to the ground, and a platform suitable for supporting at least one solar collector and fastened on at least one horizontal central beam rotatably mounted on the fixed structure around a horizontal axis of rotation inside at least one bearing fastened on the fixed structure, the platform therefore being pivotally movable around this horizontal axis of rotation.

BACKGROUND

Thus, it is known, in particular from the documents DE 10 2006 036 150 and US 2008/0308091, to use bearings of the type comprising an annular sleeve inside which the central beam is pivotally mounted, these bearings being generally of the type journal bearing. In this manner, the horizontal axis of rotation is coincident with the central axis of the annular sleeve, which is in turn coincident with the central axis of the central beam. Thus, the horizontal axis of rotation is away from the platform by a minimum distance substantially equivalent to the outer radius of the cylindrical sleeve of the bearing, thereby contributing in bringing the horizontal axis of rotation away from the center of gravity of the platform/solar collector(s) set.

Still, the more the horizontal axis of rotation is away from the center of gravity of the platform/solar collector(s) set, and the more the efforts to achieve in order to make this platform/solar collector(s) set rotate about this horizontal axis of rotation will be high.

BRIEF SUMMARY

The present invention aims to propose a single-axis tracker support system integrating one or several bearing(s) which allow bringing the horizontal axis of rotation close to the center of gravity of the platform/solar collector(s) set, or still making this horizontal axis of rotation pass by this center of gravity.

To this end, it proposes a single-axis tracker support system for at least one solar collector, in particular of the type photovoltaic panel, said support system comprising:

a fixed structure for anchorage to the ground; and a platform suitable for supporting the at least one solar collector, said platform being fastened on at least one horizontal central beam rotatably mounted on the fixed structure around a horizontal axis of rotation inside at least one bearing fastened on the fixed structure;

said support system being remarkable in that the at least one bearing comprises:

a rotatable part including, on the one hand, a housing for receiving the central beam and, on the other hand, a guide rail presenting a circular-arc shape centered on said horizontal axis of rotation, said guide rail extending below said housing; and a base held on the fixed structure and onto which are fastened rolling members mounted so as to roll in the guide rail of the rotatable part.

Thus, the position of the horizontal axis of rotation is determined by the guide rail, and the position of the platform is determined by the housing which supports the central beam. Thus, by acting on the relative position of the housing with respect to the guide rail, and by acting on the shape of the guide rail, it acts on the position of the platform with respect to this horizontal axis of rotation, thereby allowing to master the horizontal axis of rotation to get closer to the center of gravity of the platform/solar collector(s) set.

It is quite obvious that, in the context of the invention, the guide rail presents a circular-arc shape, and not a full circle shape. Thus, this guide rail forms a rolling track generating a rotation stroke centered on the horizontal axis of rotation for the rotatable part, and therefore for the central beam rotatably secured to this rotatable part, via the rolling members rolling in the guide rail.

According to one feature, the housing is formed of a notch open at the top and closed by a bracket fastened on the rotatable part, this bracket clamping the central beam in said notch.

Thus, the central beam is housed within in the housing of the rotatable part, before being clamped with the closure bracket, thereby allowing bringing the platform close to the bearing.

According to another feature, the bracket presents an upper bearing surface onto which the platform rests.

Thus, the platform is away from the central beam only but by the thickness of the bracket, thereby ensuring a close proximity between the platform and the bearing.

In a particular embodiment, the rotatable part presents two flat upper edges arranged on either side of the notch, said upper edges being substantially coplanar with the upper bearing surface of the bracket so that the platform rests both on this upper bearing surface and on said upper edges.

Thus, the platform has a stable support both on the bracket and on the rotatable part.

In a particular embodiment, the guide rail is constituted by a through slot provided in the rotatable part, the rolling members being mounted so as to roll in said slot.

Advantageously, the base comprises two lateral elements arranged on either side of the slot provided in the rotatable part, the rolling members being fastened on said lateral elements and interposed between these lateral elements which hold them in place in said slot.

Thus, the rolling members are caged or enclosed between the two lateral elements, thereby guaranteeing an excellent mechanical stability of the mounting of the rolling members inside the arcuate slot.

According to one possibility of the invention, the rotatable part is composed of at least one thin plate in which the housing and the guide rail are provided.

According to another possibility of the invention, the guide rail presents a circular-arc shape of an angular sector smaller than or equal to 220°, preferably between 90° and 180° and still preferably between 120° and 170°.

In accordance with another advantageous feature of the invention, the central beam extends along a central axis, and wherein the housing and the guide rail are configured so that the horizontal axis of rotation is located above the central axis of said central beam.

Thus, the horizontal axis of rotation is brought closer to the platform and therefore to the center of gravity of the platform/solar collector(s) set.

Advantageously, the housing and the guide rail are configured so that the horizontal axis of rotation is located above the central beam, at the level of the platform.

Thus, the horizontal axis of rotation is located at the level of the platform, and therefore proximate to or still over the center of gravity of the platform/solar collector(s) set.

Still advantageously, the rolling members are of the ball bearing type, needle bearing type or roller bearing type, which have the advantage of guaranteeing a pivoting of the rotatable part almost without friction regarding the fixed base.

The present invention also concerns the feature according to which the guide rail presents two opposite terminations, forming stoppers for the rolling members.

In a particular embodiment, these terminations are located vertically below an upper face of the central beam in a flat configuration wherein the platform is horizontal.

Thus, the guide rail does not surpass the central beam, thereby allowing bringing the platform closer to the central beam.

According to another characteristic arrangement, the tracker support system further comprises a system for driving in rotation the central beam, this driving system being coupled to an actuator in order to drive the rotating of the platform around the horizontal axis of rotation.

BRIEF DESCRIPTION OF THE DRAWINGS

Other features and advantages of the present invention will appear upon reading the detailed description hereinafter, of a non-limiting example of implementation, made with reference to the appended figures in which.

DETAILED DESCRIPTION

Referring to the figures, a single-axis tracker support system 1 in accordance with the invention constitutes a tracker support system 1 for a solar plant IN by supporting one or several solar collector(s) 9. In the following description, the solar collectors 9 are photovoltaic panels.

Figure 1:
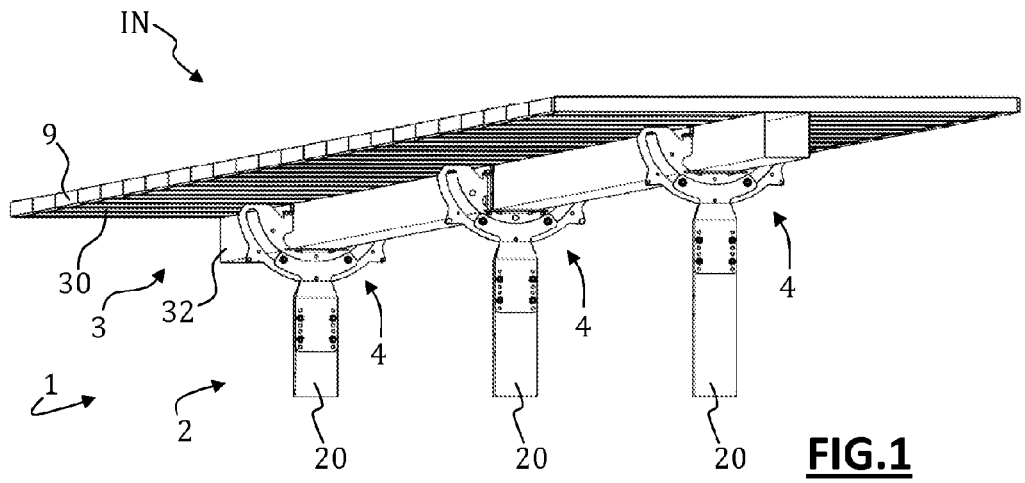
FIG. 1 is a partial schematic bottom perspective view of a tracker support system in accordance with the invention, with photovoltaic panels in place on the platform.
Figure 2:
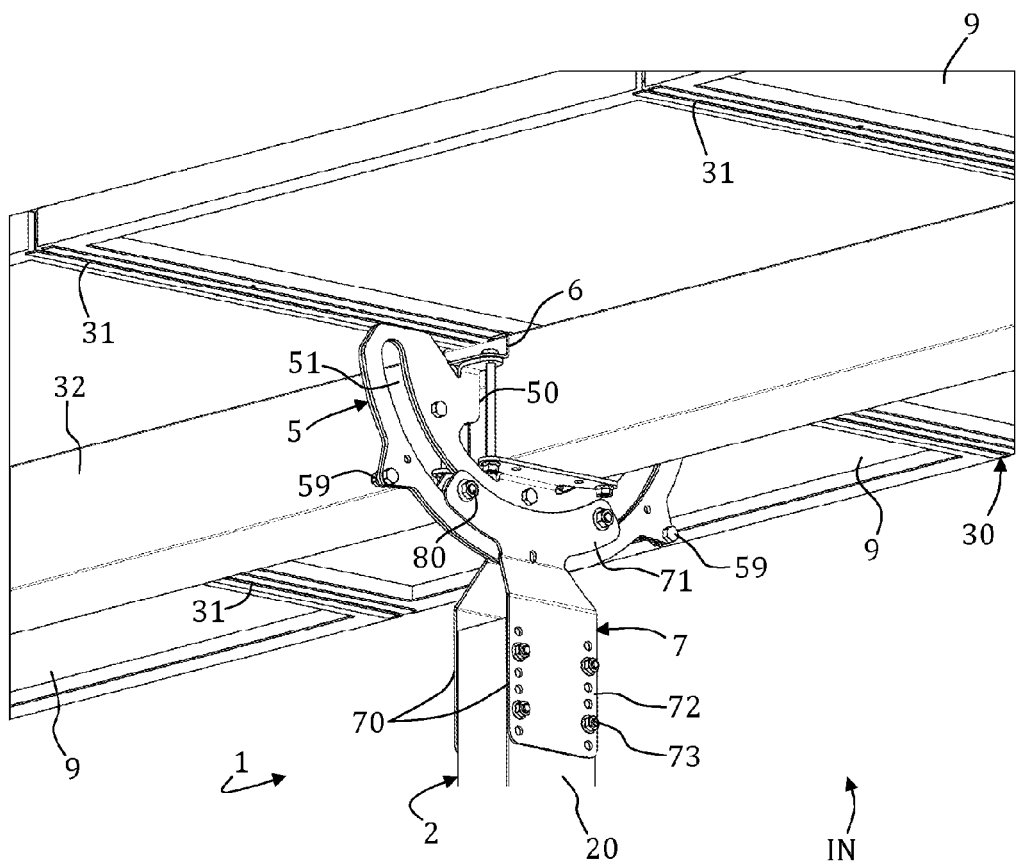
FIG. 2 is a partial schematic bottom perspective view of the tracker support system of FIG. 1, with an enlargement on a bearing in accordance with the invention and with photovoltaic panels in place on the platform.

This tracker support system 1 comprises a fixed structure 2 for anchorage to the ground. Referring to FIG. 1, the fixed structure 2 is constituted by several pylons 20 anchored to the ground, for example by pilling, screwing, bolting, ballasting, or any other equivalent means allowing fastening and stabilizing the fixed structure 2 to the ground.

This tracker support system 1 further comprises a movable structure 3 rotatably mounted on the fixed structure 2 around a horizontal axis of rotation A, and more specifically, rotatably mounted on the upper ends of the pylons 20.

The movable structure 3 includes a platform 30 suitable for supporting the photovoltaic panels 9. For example, this platform 30 is composed of an assembly of girders 31, such as corner pieces or profiles, which receive the photovoltaic panels 9; these photovoltaic panels 9 being fastened on these girders 31, in particular by screwing.

The movable structure 3 also includes a horizontal central beam 32 on which the platform 30 is fastened. The central beam 32 is rotatably mounted on the fixed structure 2 about the horizontal axis of rotation A, and is more specifically rotatably mounted on the upper ends of the pylons 20 inside bearings 4; these bearings 4 being fastened on the upper ends of the pylons 20.

The central beam 32 extends along a horizontal central axis B, and is in the form of a tubular beam of a square-shaped cross-section in the example illustrated in the figures, of course with the possibility that other cross-section shapes for the central beam 32 may be considered, such as circular and rectangular sections.

All bearings 4 are identical, and each bearing 4 mainly comprises a rotatable part 5 and a bracket 6 rotatably secured to the central beam 32, as well as a base 7 secured to the fixed structure 2 and rolling members 8 of the ball bearing type. It is also possible to consider that all or part of the rolling members 8 are of the needle bearing type or roller bearing type, in particular cylindrical roller bearing type.

The rotatable part 5 is composed of a thin plate, made in the form of two metallic plates pressed and fastened against each other, for example by bolting by means of screw/nut sets 59, or possibly by welding. It is of course possible that the rotatable part 5 is composed of one single metallic plate.

The rotatable part 5 presents a symmetry with respect to a midplane comprising the horizontal axis of rotation A, this midplane being vertical in a flat configuration wherein the platform 30 is horizontal.

The rotatable part 5 is generally « U »-shaped and presents a notch 50 open at the top and forming a housing for receiving the central beam 32.

The rotatable part 5 also presents a through slot 51 presenting a circular-arc shape centered on the horizontal axis of rotation A, and of an angular sector comprised between 120° and 180°, in particular between 150 and 170°. Hence, the aforementioned midplane of symmetry extends radially with respect to the circular-arc shaped slot 51.

This slot 51 extending below the notch 50 and rising at the sides on either side of this notch 50. Thus, the notch 50 is located inside the inscribed imaginary circle centered on the horizontal axis of rotation A and following the slot 51.

Figure 3:
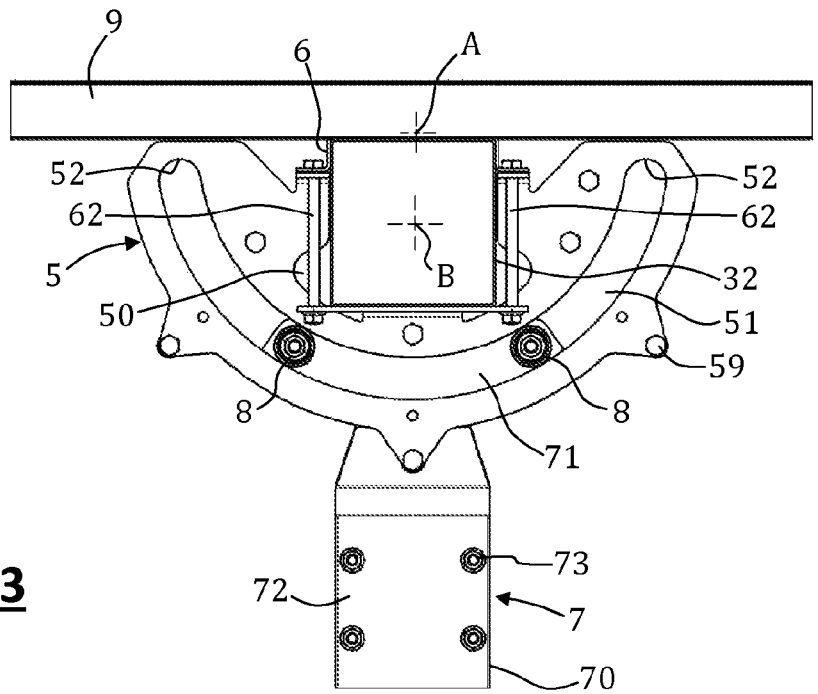
FIGS. 3 and 4 are schematic front views of the tracker support system of FIG. 1, respectively in a flat configuration with the platform being horizontal (FIG. 3) and in an inclined configuration with the platform being inclined relative to the horizontal (FIG. 4), each of these figures illustrating a bearing from which a lateral element has been partially stripped of its base so as to visualize the position of the rolling members in the guide slot.

Referring to FIG. 3, the slot 51 presents two opposite terminations 52, forming stoppers for the rolling members 8, these terminations 52 being located vertically substantially at the same level as the upper entrance of the notch 50 in a configuration called flat configuration where the platform is horizontal.

The central beam 32 presents a height larger than the depth of the notch 50, so that this central beam 32 projects upwards from the notch 50, in other words it projects from its upper entrance. Thus, the central beam 32 presents an upper face 33 outside of the notch 50, and the terminations 52 of the slot 51 are therefore located vertically below this upper face 33 of the central beam 32 in the flat configuration.

The rotatable part 5 presents two flat upper edges 53 disposed on either side of the notch 50 and located above the respective terminations 52 of the slot 51. These upper edges 53 are horizontal and are located vertically above the upper entrance of the notch 50 in the flat configuration.

The rotatable part 5 presents, on each side of the notch 50, upper tabs 54 extending horizontally in the flat configuration, and protruding to the right and to the left of the metallic plate(s). The upper edges 53 are located vertically above these upper tabs 54 in the flat configuration. Each of these upper tabs 54 is pierced with a hole.

The rotatable part 5 presents, in the bottom of the notch 50, two lower tabs 55 extending horizontally in the flat configuration, and protruding to the right and to the left of the metallic plate(s). Each of these lower tabs 55 is pierced with two holes aligned with the holes of the upper tabs 54. The central beam 32 bears against these lower tabs 55.

The notch 50 presents at least one portion substantially as large as the central beam 32, in order to laterally block the central beam 32 inside the notch 50.

The bracket 6 closes the notch 50 of the rotatable part 5 and is fastened on this rotatable part 5 so as to clamp the central beam 32 inside this notch 50.

The bracket 6 presents a central flange 60 which conforms to the upper portion of the central beam 32 projecting from the notch 50, this flange 60 therefore bearing against the upper face 33 of the central beam 32.

The bracket 6 also presents two flat legs 61, extending on either side of the flange 60, these legs 61 bearing against the upper tabs 54 of the rotatable part 5. Each of these legs 61 is pierced with two holes aligned with the holes of the upper tabs 54.

The bracket 6 is clamped against the central beam 32 and fastened on the rotatable part 5 by means of four screw/nut sets 62 which pass through the respective holes of the legs 61, the upper tabs 54 and the lower tabs 55.

Figure 4:
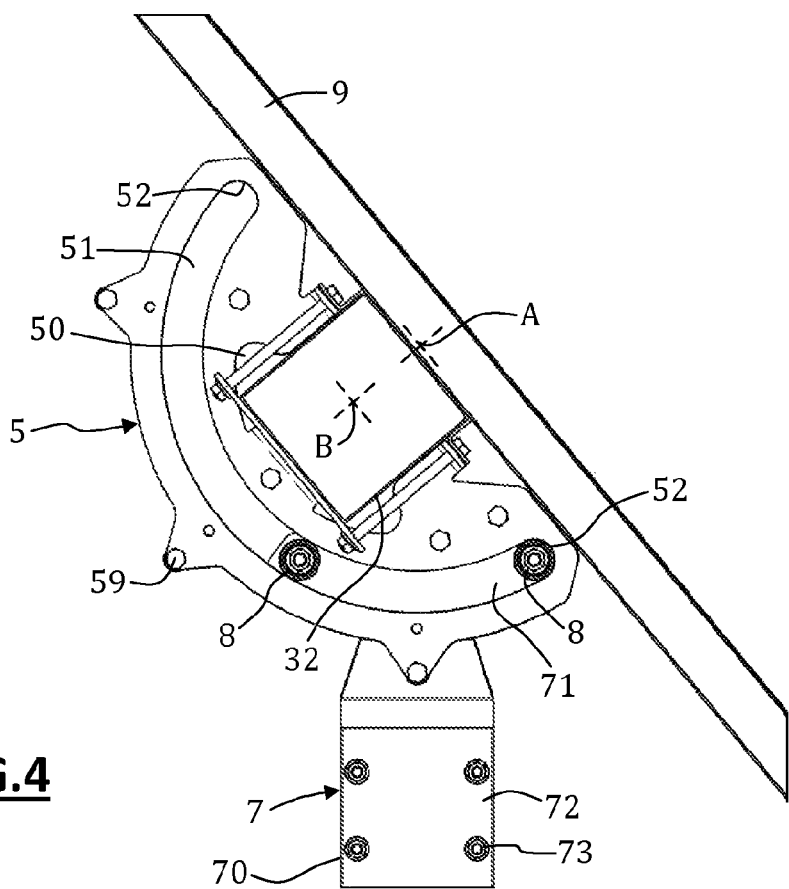
Figure 5:
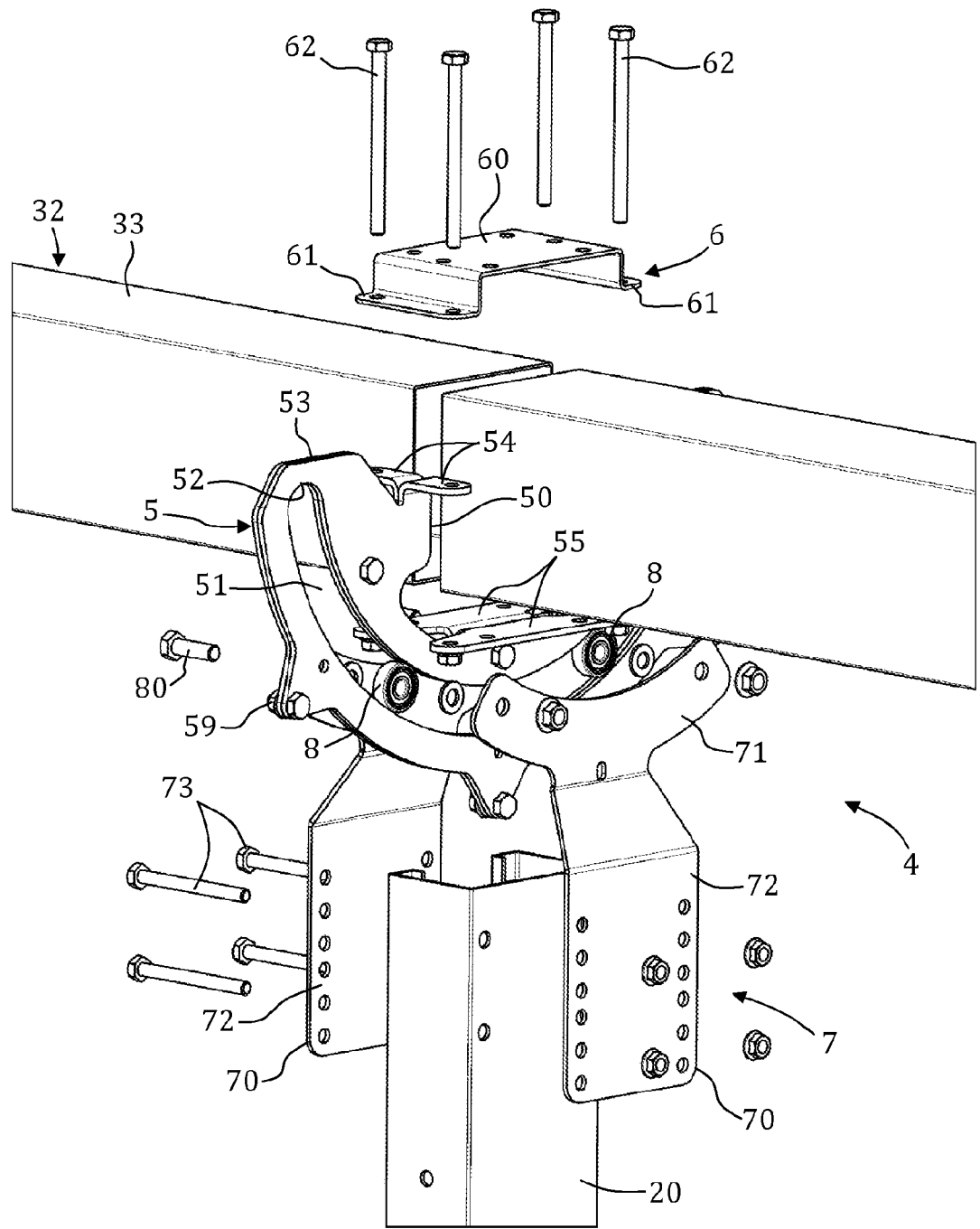
FIG. 5 is a partial and exploded schematic top perspective view of the tracker support system of FIG. 1, allowing visualizing a bearing in an exploded state.
Figure 6:
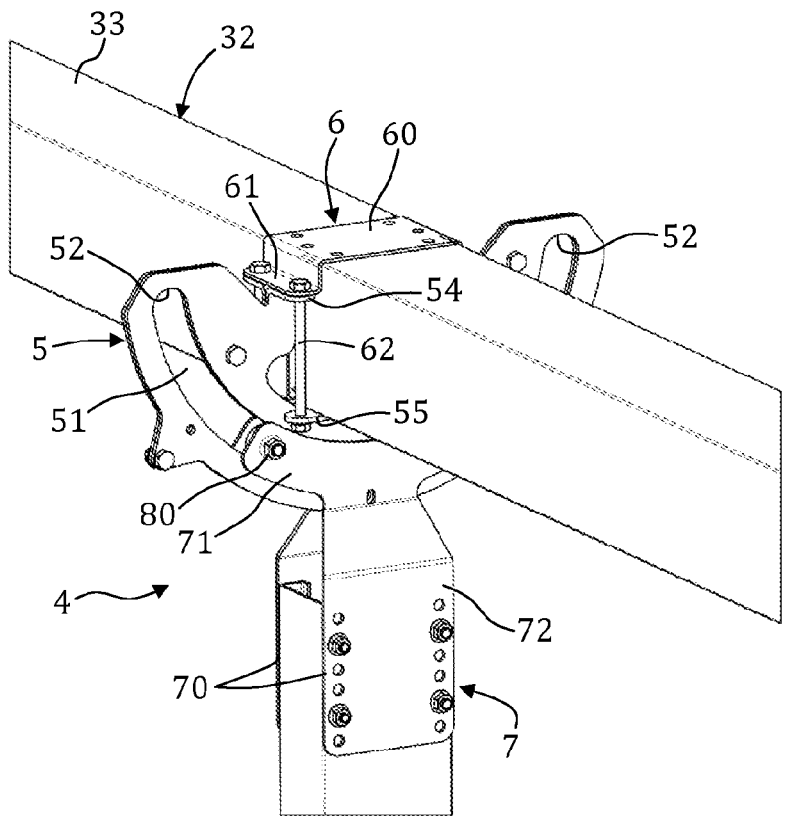
FIGS. 6 and 7 are partial schematic top perspective views of the tracker support system of FIG. 1, respectively in a flat configuration with the platform being horizontal (FIG. 6) and in an inclined configuration with the platform being inclined with respect to the horizontal (FIG. 7), where the platform and the photovoltaic panels are not illustrated for the sake of clarity.
Figure 7:
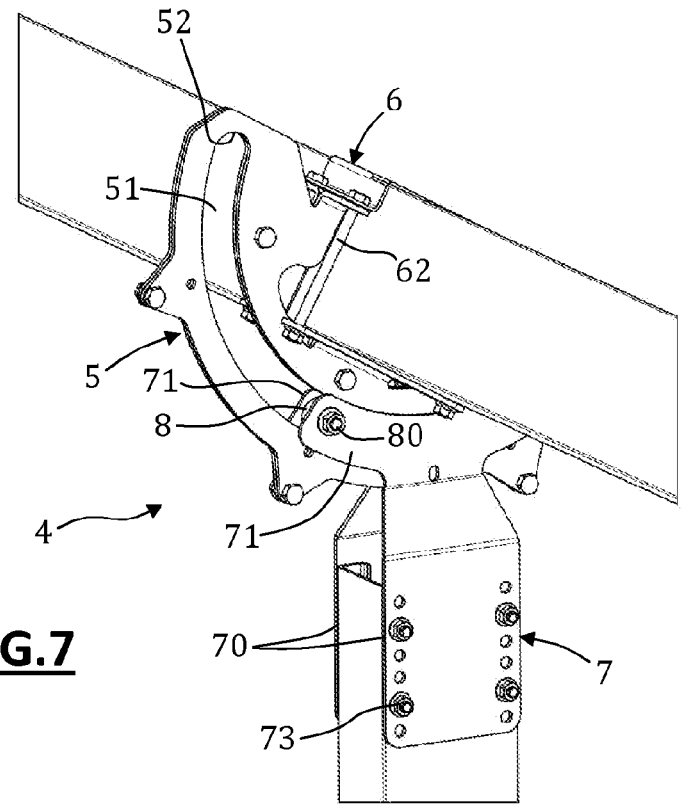

As visible in FIGS. 3 and 4, the flange 60 defines an upper bearing surface on which the platform 30 rests and the upper edges 53 of the rotatable part 5 are substantially coplanar with the upper bearing surface of the flange 60 of the bracket 6, so that the platform 30 rests both on this upper bearing surface and on these upper edges 53.

As illustrated in FIG. 3, the notch 50 and the slot 51 are shaped so that the horizontal axis of rotation A is located above the central axis B of the central beam 32, or still located above the central beam 32 at the level of the platform 30, and preferably so that the horizontal axis of rotation A passes through the center of gravity G of the platform 30/photovoltaic panels 9 set.

The base 7 is composed of two folded metallic plates 70 forming lateral elements surrounding the rotatable part 5.

Each plate 70 comprises an upper portion 71 pierced with two holes for fastening two rolling members 8. In situation, the upper portions 71 of the two plates 70 are disposed on either side of the slot 54 of the rotatable part 5, and the rolling members 8 are fastened on these upper portions 71, between these upper portions 71 facing each other. More specifically, the rolling members 8 are fastened by bolting by means of screw/nut sets 80 passing both through the aligned holes of the upper portions 71 and the annular rolling members 8.

Thus, the rolling members 8 are mounted so as to roll in the slot 51 and are interposed between these upper portions 71 which hold them in place in the slot 51. Thus, when the platform 30 pivots, the rotatable part 5 pivots with the central beam 32, this pivoting of the rotatable part 5 relative to the fixed base 7 being allowed and guided by the rolling contact of the rolling members 8 inside the slot 51 of the rotatable part 5.

Each plate 70 comprises a lower portion 72 also pierced with holes for a fastening by bolting, by means of screw/nut sets 73, on the upper end of the corresponding pylon 20. Preferably, the lower portion 72 presents series of several vertically aligned holes, in order to adapt the vertical position of the bearing 4 on the corresponding pylon 20, for the sake of establishing the horizontality of the central beam 32 and therefore of the platform 30.

It is also to be noted that the tracker support system in accordance with the invention is equipped with a system (not illustrated) for driving in rotation the central beam 32, in order to ensure rotating the platform 30 around the horizontal axis of rotation A. This driving system is coupled to and controlled by an actuator, for example of the cylinder actuator type (electric, pneumatic or hydraulic) or of the electric motor type (for example rotary motor). The driving system forms a mechanical system for transmitting the movement at the output of the actuator (a rotational movement for a rotary motor, or a linear movement for a cylinder actuator) into a rotational movement of the central beam 32. As a non-limiting example, this driving system may be a deformable-parallelogram system, a pulley system, a pinion system, a chain system, a belt system, a clutch system, a transmission shaft system, a connecting rod system, etc.

The actuator may be suitable for the tracker support system, or may be shared between several tracker support systems. In the case where the actuator is shared, the central beams 32 of the different tracker support systems are rotatably coupled, for a synchronous rotation under the effect of the common actuator.

Of course, the example of implementation mentioned hereinabove is not limiting and other improvements and details may be added to the tracker support system according to the invention, nevertheless without departing from the scope of the invention where other types of fixed structure or platform may be for example carried out.

The invention claimed is:

1. A single-axis tracker support system for at least one solar collector, said support system comprising:
   a fixed structure for anchorage to a ground; and
   a platform configured to support the at least one solar collector, said platform being fastened on at least one horizontal central beam rotatably mounted on the fixed structure around a horizontal axis of rotation inside at least one bearing fastened on the fixed structure; wherein at least one bearing comprises:
- a rotatable part including, on the one hand, a housing for receiving the horizontal central beam and, on the other hand, a guide rail presenting a circular-arc shape centered on said horizontal axis of rotation, said guide rail extending below said housing; and
- a base held on the fixed structure and onto which are fastened rolling members, said rolling members being mounted so as to roll in the guide rail of the rotatable part.

2. The single-axis tracker support system according to claim 1, wherein the housing is formed by a notch open at the top and closed by a bracket fastened on the rotatable part, said bracket clamping the horizontal central beam in said notch.

3. The single-axis tracker support system according to claim 2, wherein the bracket presents an upper bearing surface onto which the platform rests.

4. The single-axis tracker support system according to claim 1, wherein the guide rail is constituted of a through slot provided in the rotatable part, the rolling members being mounted so as to roll in said through slot.

5. The single-axis tracker support system according to claim 4, wherein the base comprises two lateral elements arranged on either side of the through slot provided in the rotatable part, the rolling members being fastened on said lateral elements and interposed between these lateral elements which hold them in place in said through slot.

6. The single-axis tracker support system according to claim 1, wherein the rotatable part is composed of at least one thin plate in which the housing and the guide rail are provided.

7. The single-axis tracker support system according to claim 1, wherein the guide rail presents a circular-arc shape of an angular sector smaller than or equal to 220°.

8. The single-axis tracker support system according to claim 1, wherein the horizontal central beam extends along a central axis, and wherein the housing and the guide rail are configured so that the horizontal axis of rotation is located above the central axis of said horizontal central beam.

9. The single-axis tracker support system according to claim 8, wherein the housing and the guide rail are shaped so that the horizontal axis of rotation is located above the horizontal central beam, at the level of the platform.

10. The single-axis tracker support system according to claim 1, wherein the rolling members are of the ball bearing type, needle bearing type or roller bearing type.

11. The single-axis tracker support system according to claim 1, further comprising a driving system configured for driving in rotation the horizontal central beam, said driving system being coupled to an actuator in order to drive the rotating of the platform around the horizontal axis of rotation.

12. The single-axis tracker support system according to claim 7, wherein the angular sector of the circular-arc shaped guide rail is between 90° and 180°.

13. The single-axis tracker support system according to claim 7, wherein the angular sector of the circular-arc shaped guide rail is between 120° and 170°.

* * * * *